US012620015B2

(12) United States Patent
Mani et al.

(10) Patent No.: US 12,620,015 B2
(45) Date of Patent: May 5, 2026

(54) SYSTEM, NON-TRANSITORY COMPUTER READABLE MEDUM, AND METHOD FOR DETERMINING TEMPORAL LOYALTY

(71) Applicant: Walmart Apollo, LLC, Bentonville, AR (US)

(72) Inventors: Venugopal Mani, Sunnyvale, CA (US); Ramasubramanian Balasubramanian, San Bruno, CA (US); Sushant Kumar, San Jose, CA (US); Kannan Achan, Saratoga, CA (US); Abhinav Mathur, San Bruno, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 383 days.

(21) Appl. No.: 17/929,288

(22) Filed: Sep. 1, 2022

(65) Prior Publication Data

US 2023/0177585 A1      Jun. 8, 2023

Related U.S. Application Data

(60) Provisional application No. 63/264,925, filed on Dec. 3, 2021.

(51) Int. Cl.
*G06Q 30/00* (2023.01)
*G06Q 30/0201* (2023.01)
*G06Q 30/0601* (2023.01)

(52) U.S. Cl.
CPC ..... *G06Q 30/0631* (2013.01); *G06Q 30/0201* (2013.01); *G06Q 30/0641* (2013.01)

(58) Field of Classification Search
CPC ............ G06Q 30/0631; G06Q 30/0601–0645
See application file for complete search history.

(56) References Cited

U.S. PATENT DOCUMENTS 8,341,158 B2 * 12/2012 Acharya ............ G06F 16/9535
                                                                    707/738
10,089,675 B1 * 10/2018 Rastogi ................ G06Q 10/067
                                          (Continued)

FOREIGN PATENT DOCUMENTS

KR                102070049 B1      4/2020

OTHER PUBLICATIONS

Xiao, Teng, and Hong Shen. "Neural variational matrix factorization for collaborative filtering in recommendation systems." Applied Intelligence 49 (2019): 3558-3569. (Year: 2019).*

(Continued)

*Primary Examiner* — Jeffrey A. Smith
*Assistant Examiner* — Kennedy Gibson-Wynn
(74) *Attorney, Agent, or Firm* — Morgan, Lewis & Bockius LLP; Manita Rawat

(57) ABSTRACT

Systems and methods for attribute recommendation are disclosed. Transaction data related a user is received and attribute recommendations for the user are generated based on the transaction data. The attribute recommendations are generated by a variational inference model configured using a transaction matrix and a loyalty matrix. A set of N recommendations is generated by ranking the generated attribute recommendations based on a combined transaction score and loyalty score and a user interface is generated including the set of N recommendations.

20 Claims, 9 Drawing Sheets

(56) References Cited

U.S. PATENT DOCUMENTS

| | | | | |
|---|---|---|---|---|
| 11,540,017 B1* | 12/2022 | Moor | .................. | G06Q 30/0631 |
| 2013/0024318 A1* | 1/2013 | Zhang | .................... | G06N 20/00 |
| | | | | 705/26.7 |
| 2015/0278350 A1* | 10/2015 | Nice | .................. | G06Q 30/0631 |
| | | | | 707/754 |
| 2018/0121987 A1 | 5/2018 | Akkiraju et al. | | |
| 2021/0089884 A1 | 3/2021 | Macready et al. | | |
| 2021/0248449 A1* | 8/2021 | Sun | ...................... | G06F 16/9024 |
| 2021/0373921 A1* | 12/2021 | Neumann | .......... | G06Q 30/0641 |
| 2023/0101928 A1* | 3/2023 | Pande | ................ | G06Q 30/0631 |
| | | | | 705/26.7 |

OTHER PUBLICATIONS

J. Z. Sun, D. Parthasarathy and K. R. Varshney, "Collaborative Kalman Filtering for Dynamic Matrix Factorization," in IEEE Transactions on Signal Processing, vol. 62, No. 14, pp. 3499-3509, Jul. 15, 2014 (Year: 2014).*

F. Gao, C. Xing, X. Du and S. Wang, "Personalized service system based on hybrid filtering for digital library," in Tsinghua Science and Technology, vol. 12, No. 1, pp. 1-8, Feb. 2007, doi: 10.1016/S1007-0214(07)70001-9 (Year: 2007).*

Wujian Yang, Zebing Wang and Mingyu You, "An improved collaborative filtering method for recommendations' generation," 2004 IEEE International Conference on Systems, Man and Cybernetics (IEEE Cat. No. 04CH37583), The Hague, Netherlands, 2004, pp. 4135-4139 vol. 5, doi: 10.1109/ICSMC.2004.1401179. (Year: 2004).*

Mani, et al., "On Variational Inference for User Modeling in Attribute-Driven Collaborative Filtering", Dec. 2020 IEEE International Conference on Big Data, 9 pages.

Balasubramanian, et al., "Variational Inference for Category Recommendation in E-Commerce platforms", Apr. 2021, arXiv, 8 pages.

Rabiu, et al., "Exploiting dynamic changes from latent features to improve recommendation using temporal matrix factorization", 2020, Egyptian Informatics Journal 22: 285-294.

Liu, "Modeling Users' Dynamic Preference for Personalized Recommendation", Jul. 2015, Proceedings of the Twenty-Fourth International Joint Conference on Artificial Intelligence, 1785-1791.

Chalyi, et al., "Temporal Modeling of User Preferences in Recommender System", 2020, 11 pages.

Askari, et al., "Joint Variational Autoencoders for Recommendation with Implicit Feedback", Aug. 2020 ,arXiv, 9 pages.

Li, et al., "Collaborative Variational Autoencoder for Recommender Systems", Aug. 2017, KDD '17: Proceedings of the 23rd ACM SIGKDD International Conference on Knowledge Discovery and Data Mining, 305-314.

* cited by examiner

SYSTEM, NON-TRANSITORY COMPUTER READABLE MEDUM, AND METHOD FOR DETERMINING TEMPORAL LOYALTY

CROSS-REFERENCE TO RELATED APPLICATIONS

This application claims benefit under 35 U.S.C. 119(e) to U.S. Provisional Patent Appl. No. 63/264,925, filed Dec. 3, 2021, entitled "System and Methods for Determining Temporal Loyalty," the disclosure of which is incorporated herein by reference in its entirety.

TECHNICAL FIELD

This application relates generally to attribute recommendation and, more particularly, to attribute recommendation using a time-related matrix.

BACKGROUND

Interactions between users and systems may vary over time, with certain user interactions or preferences becoming more or less prevalent over predetermined time periods. In environments configured to provide interactions with multiple variations of similar elements, users may develop or change preferences for interactions with specific versions of a variant element or item. For example, in an e-commerce environment, an individual user may express one or more preferences for brands, styles, etc. of specific items available within the e-commerce interface. These preferences may change over time.

Personalizing user interfaces, such as e-commerce interfaces, drives user satisfaction and engagement for network interfaces. Current network interfaces are capable of suggesting categories or items based on prior interactions but fail to account for user preferences that can be identified based on temporal interactions with the system. Current systems implement a graphical structure that ignores or excludes temporal data from the consideration.

SUMMARY

In various embodiments, a system is disclosed. The system includes a non-transitory memory having instructions stored thereon and a processor configured to read the instructions. The processor is configured to receive transaction data related a user, generate attribute recommendations for the user based on the transaction data, generate a set of N recommendations by ranking the generated attribute recommendations based on a combined transaction score and loyalty score, and generate a user interface including the set of N recommendations. The attribute recommendations are generated by a variational inference model configured using a transaction matrix and a loyalty matrix.

In various embodiments, a non-transitory computer readable medium having instructions stored thereon is disclosed. The instructions, when executed by a processor cause a device to perform operations including receiving transaction data related a user, generating attribute recommendations for the user based on the transaction data, generating a set of N recommendations by ranking the generated attribute recommendations based on a combined transaction score and loyalty score, and generating a user interface including the set of N recommendations. The attribute recommendations are generated by a variational inference model configured using a transaction matrix and a loyalty matrix.

In various embodiments, a computer-implemented method is disclosed. The computer-implemented method includes the steps of receiving transaction data related a user, generating attribute recommendations for the user based on the transaction data, generating a set of N recommendations by ranking the generated attribute recommendations based on a combined transaction score and loyalty score, and generating a user interface including the set of N recommendations. The attribute recommendations are generated by a variational inference model configured using a transaction matrix and a loyalty matrix.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
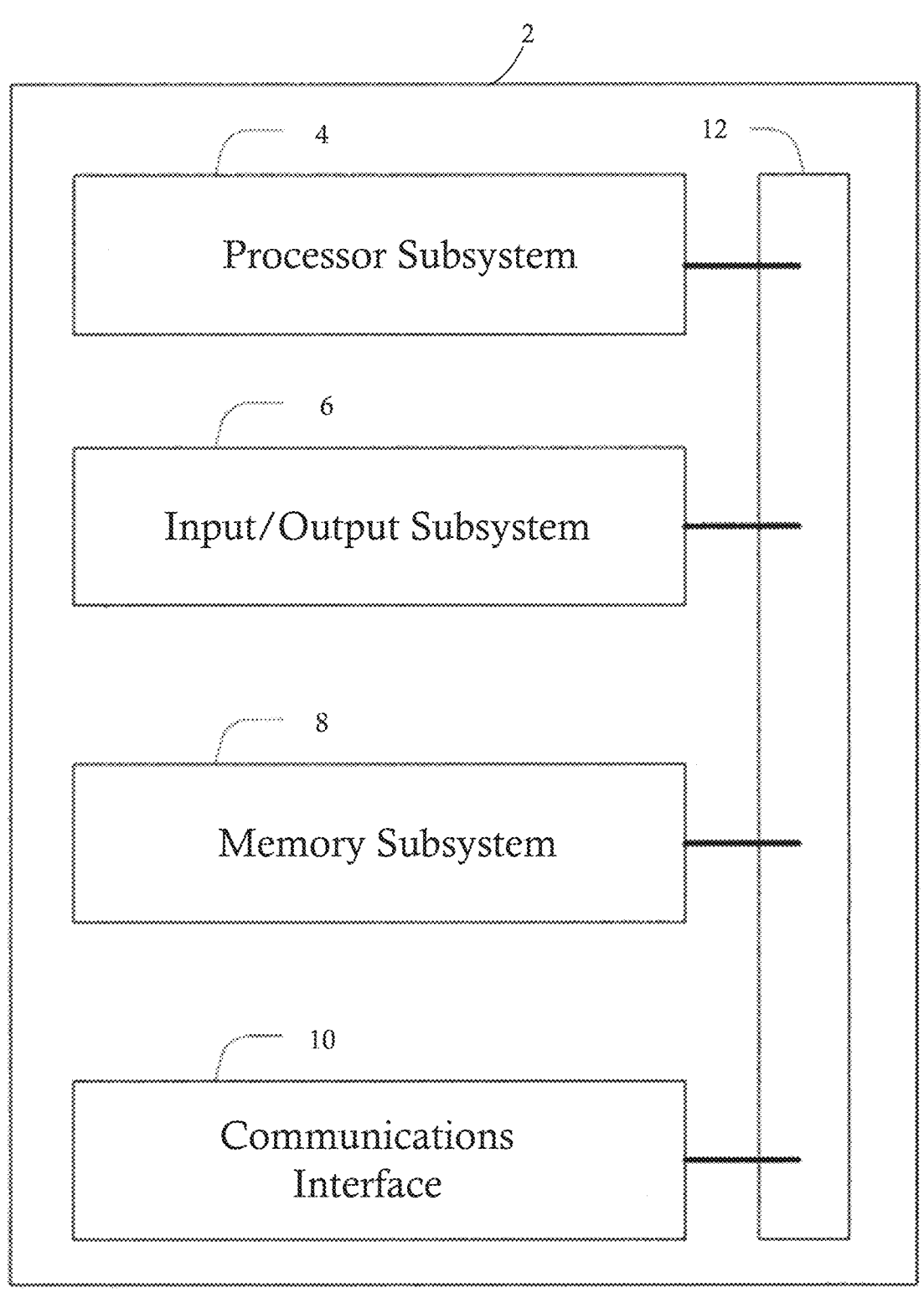
FIG. 1 illustrates a block diagram of a computer system, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In various embodiments, systems and methods of attribute recommendation using a temporal loyalty are disclosed. When a user interacts with an interface, such as an e-commerce interface, historical data may be retrieved for the user. Historical data may include, but is not limited to, historical transaction data. The historical transaction data is provided to a trained selection model configured to identify attribute affinities for the user based on the historical data. The trained selection model includes a variational inference model configured to obtain a latent space representation of the user based on the historical data. The latent space representation is used to generate relevant attribute recommendations, such as category recommendations, for the user.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open-source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra-Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods for category recommendation based on temporal loyalty, as described herein. The instruction set may be stored in any acceptable form of machine-readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 4.

Figure 2:
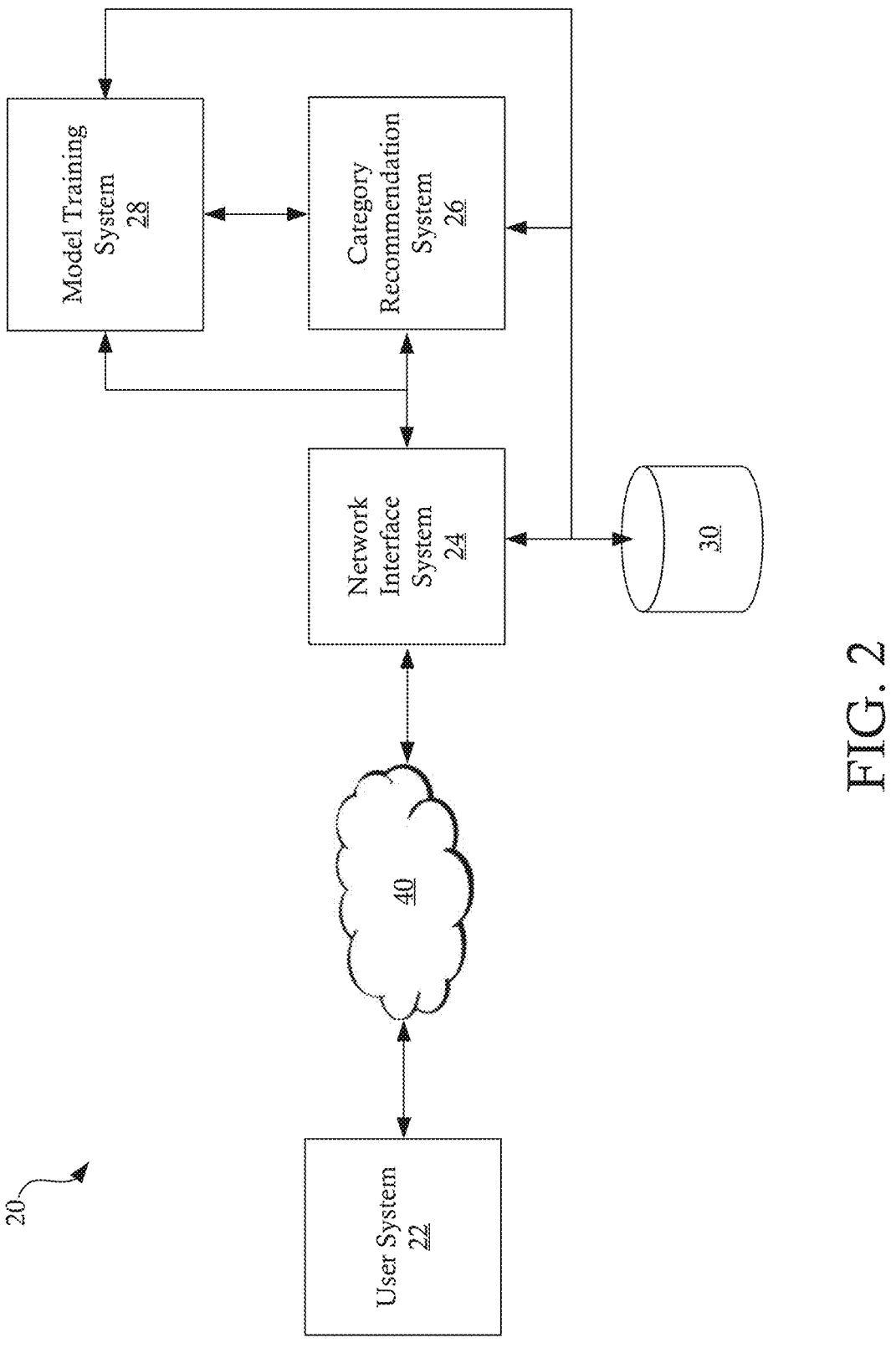
FIG. 2 illustrates a network environment configured to provide categorical recommendations to a user system based, at least in part, on a temporal loyalty, in accordance with some embodiments.

FIG. 2 illustrates a network environment 20 configured to provide personalized user recommendations based at least partially on a temporal loyalty, in accordance with some embodiments. The network 20 includes one or more user systems 22 in signal communication with a network interface system 24 via one or more intervening networks, illustrated as network cloud 40. The network interface system 24 is in signal communication with a recommendation system 26 and a model generation system 28. In some embodiments, the network interface system 24, the recommendation system 26 and/or the model generation system 28 are in signal communication with a product database 30 and/or a historical transaction database 32. Although embodiments are illustrated with various systems and components 24-32 shown as separate elements, it will be appreciated that various systems and components may be combined into a single system and/or be split out into additional systems. For example, in some embodiments, each of the network interface system 24, the recommendation system 26, the model generation system 28, the product database 30, and/or the historical transaction database 32 may be combined into a single system and/or divided among multiple systems. It will be appreciated that any suitable physical and/or logical combination of systems and components is possible.

In some embodiments, a user system 22 interacts with a network interface provided by the network interface system 24. The network interface may be any suitable interface. For example, in some embodiments, the network interface is an e-commerce interface configured to present one or more products, product pages, descriptions, etc. to enable a user to view and purchase items. In some embodiments, the network interface is configured to provide recommended items and/or categories of items to a user system 22 based on prior interactions between the network interface system 24 and a user associated with the user system 22. As discussed in greater detail below, the recommended items/categories may be selected by a trained selection model including a transaction score and a temporal loyalty score. In some embodiments, the historical interaction data is stored in the historical transaction database 32.

In some embodiments, the network interface system 24 receives recommendations for the user system 22 from the recommendation system 26. The recommendation system 26 generates the one or more recommendations based on a trained selection model. The trained selection model is based on a variational inference over at least two matrices: a transaction matrix and a temporal loyalty matrix. The trained selection model is configured to generate time-aware, personalized recommendations for each user based on a set of prior user interactions. The personalized recommendations may be generated and provided to the network interface system 24 at a predetermined interval, such as, for example, weekly, daily, etc.

In some embodiments, the trained selection model is generated by the model generation system 28 and provided to the recommendation system 26 and/or a production environment for deployment to a recommendation system 26. The trained selection model may be updated by replacing the current trained selection model with a new trained selection model generated by the model generation system 28 at a predetermined interval, such as, for example, bimonthly, monthly, weekly, etc. As discussed below, each trained selection model is generated, at least partially, using temporal information extracted from historical transaction data in the form of a temporal loyalty score.

Figure 3:
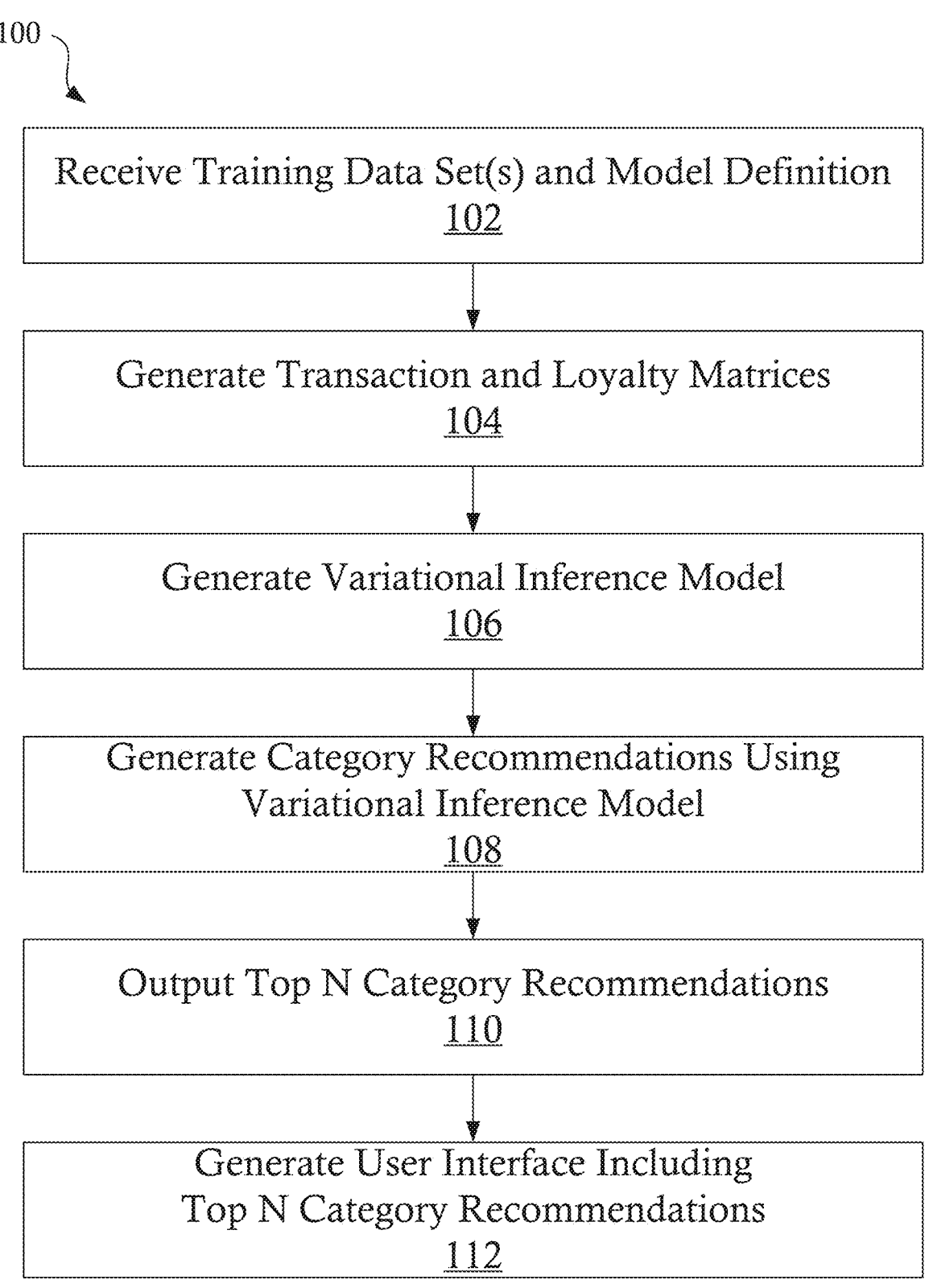
FIG. 3 a flowchart illustrating a method of providing personalized recommendations in a network interface, in accordance with some embodiments.
Figure 4:
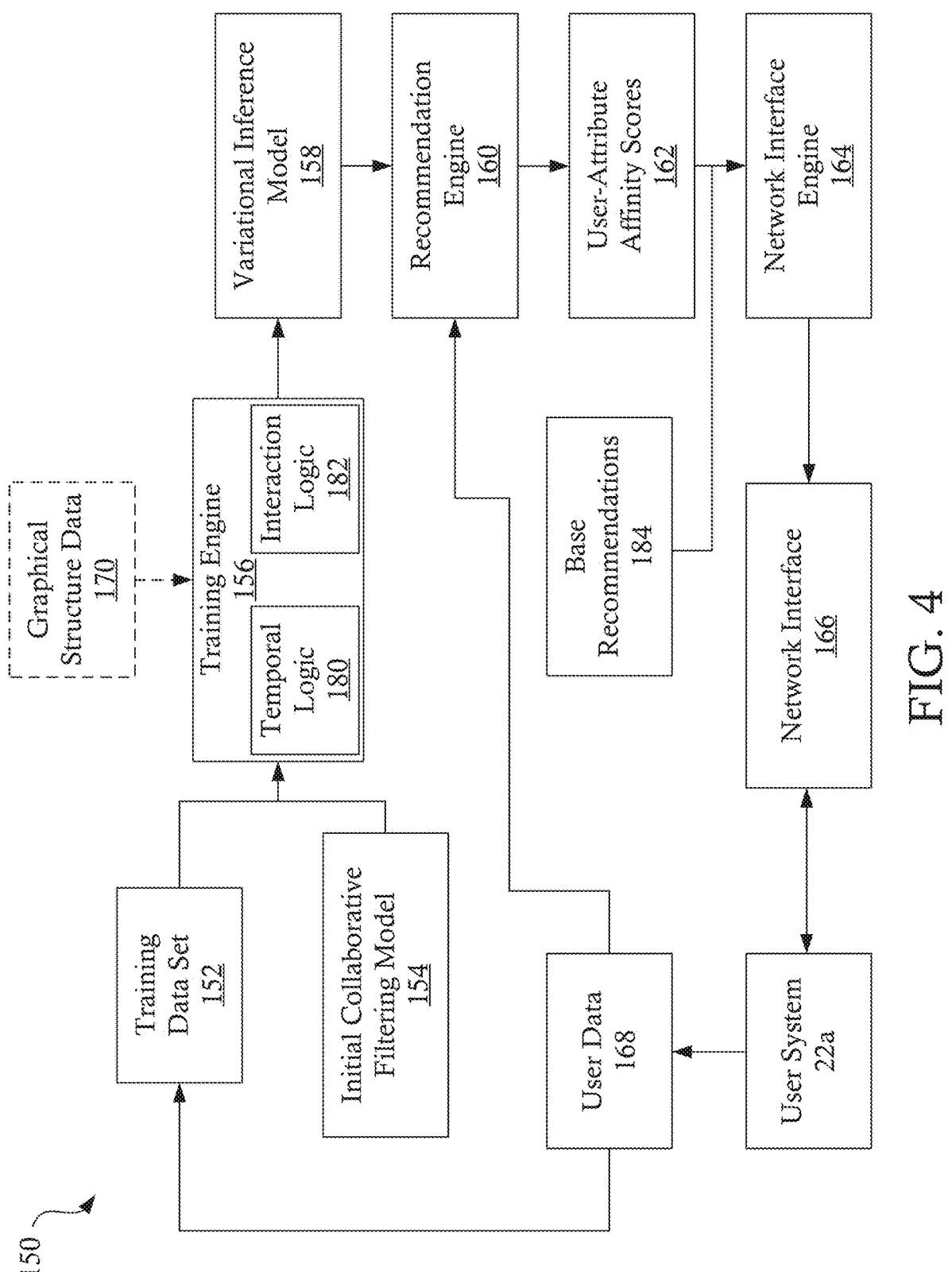
FIG. 4 is a process flow illustrating various steps of the method of providing personalized recommendations in a network interface illustrated in FIG. 3, in accordance with some embodiments.

FIG. 3 is a flowchart illustrating a method 100 of providing personalized recommendations in a network interface, in accordance with some embodiments. FIG. 4 is a process flow 150 illustrating various steps of the method 100 of providing personalized recommendations in a network interface illustrated in FIG. 3, in accordance with some embodiments. At step 102, a set of training data 152 is received by a system configured to generate a trained recommendation model, such as, for example, the model training system 28.

In some embodiments, the set of training data 152 includes prior user interactions (or impressions) with one or more systems (such as network interface system 24) and corresponding time values. User interactions may include, but are not limited to, user item interactions such as an item view (e.g., user seeing an item in search results, recommended items, ad, etc.), item click-through (e.g., user clicking on link to go to product-specific information), item add-to-cart (e.g., user adding the product to a virtual cart for future purchase), item purchase (user ordering the item), etc. In some embodiments, each item in the set of training data 152 includes a set of attributes related to one or more categories in a set of n categories. The set of training data 152 also includes time values for each of the user interactions in the set. The time values may be provided in any suitable format, such as, for example, system time references, absolute time references, time deltas from a set start time, etc.

In some embodiments, the set of training data 152 may be received from a database configured to maintain prior interaction data, such as, for example, historical transaction database 32. The set of training data 152 may be obtained from file system data, such as, for example, log data. The log data may be generated and/or maintained by any suitable system, such as the network interface system 24. In some embodiments, log data is maintained for each user. The historical transaction database 32 may be implemented as any suitable database structure, such as, for example, a Hadoop event storage database. Although specific embodiments are discussed herein, it will be appreciated that any suitable database and/or storage mechanism for storing the set of training data 152 may be used.

At step 104, a temporal loyalty matrix and a transaction matrix are generated from the set of training data 152. In some embodiments, the temporal loyalty matrix and/or the transaction matrix are generated by training engine 156 configured to implement one or more of a temporal data aggregation logic module 180 and/or an interaction logic module 182. The temporal data aggregation logic module 180 is configured to perform temporal data aggregation over a predetermined time period to generate the temporal loyalty matrix. Similarly, the interaction logic is configured to perform general aggregation of all instances of a given attribute to generate the transaction matrix. In some embodiments, the $(p,q)^{th}$ element in a transaction matrix T for a user $u_p$ and a set of attribute values $v_1, v_2, \ldots, v_n$ for a selected attribute V, is given by:

$$T_{pq} = \begin{cases} 1, u_p \text{ has bought an item with attribute value } v_q \text{ at least once} \\ 0, \text{otherwise} \end{cases}$$

Similarly, the $(p,q)^{th}$ element of the temporal matrix L is given by the time-decayed sum of all instances of an attribute value $v_q$ made by user $u_p$, where:

$$L_{pq} = \begin{cases} \sum_{t=t_1}^{t_k} 2^{\frac{t-t_{start}}{t_{end}-t_{start}}}, u_p \text{ has bought an item with attribute value } v_q \\ 0, \text{otherwise} \end{cases}$$

where $t_1, t_2, \ldots, t_k$ are time instances when a user interacted with (e.g., purchased, added to cart, etc.) items having the attribute value $v_q$, $t_{start}$ is the start time for the current training window, and $t_{end}$ is the end time for the current training window. $T_{pq}$ represents a general interaction with a given attribute while $L_{pq}$ factors the time decay of attribute loyalty over the training window. As one non-limiting example, in some embodiments, a transaction matrix T and a loyalty matrix L for a set of two users $(u_1, u_2)$ and three attributes $(b_1, b_2, b_3)$ may have values such as:

| Transaction Matrix T | | | |
| --- | --- | --- | --- |
| | b1 | b2 | b3 |
| u1 | 1 | 1 | 0 |
| u2 | 1 | 0 | 1 |

| Loyalty Matrix L | | | |
| --- | --- | --- | --- |
| | b1 | b2 | b3 |
| u1 | 3.48 | 1.99 | 0 |
| u2 | 1.01 | 0 | 1.62 |

It will be appreciated that these example values are provided solely to demonstrate the difference between the Transaction Matrix T and the Loyalty Matrix L and are not limiting.

In some embodiments, transaction matrix T includes representations of user interactions with each category in the set of n categories and the temporal loyalty matrix L represents the number of times a user interacted with an item from a given category, weighted by an exponential decay based on the time elapsed since the interaction. For example, if a user interacts with a first attribute value (such as a first brand) at a time $t_1$ and a second attribute value (such as a second brand) at a time $t_2$ that is more recent than $t_1$, the interaction with the second attribute value should be given more weight when generating attribute recommendations.

At step 106, a variational inference model 158 is generated by the model training engine 156. In some embodiments, a modified collaborative filtering model 154 configured to utilize a transaction matrix T and a loyalty matrix L is received by the training engine 156. The variational inference model 158 is generated by applying variational inference to the modified collaborative filtering model 154, as discussed in greater detail below. In some embodiments, the modified collaborative filtering model 154 is configured to model a distribution of each of the transaction matrix T and the loyalty matrix L. The values of the transaction matrix T and the loyalty matrix L may be modeled according to any suitable distribution. For example, in some embodiments, the transaction matrix T and/or the loyalty matrix L may be modeled as a Bernoulli distribution and/or a normal distribution. Although specific embodiments are discussed herein, it will be appreciated that any suitable distributions may be used. In some embodiments, a Jakkola-Jordan logistic bound may be used to replace Bernoulli terms with squared exponentials. In some embodiments, the transaction matrix T is a binary matrix.

Figure 5:
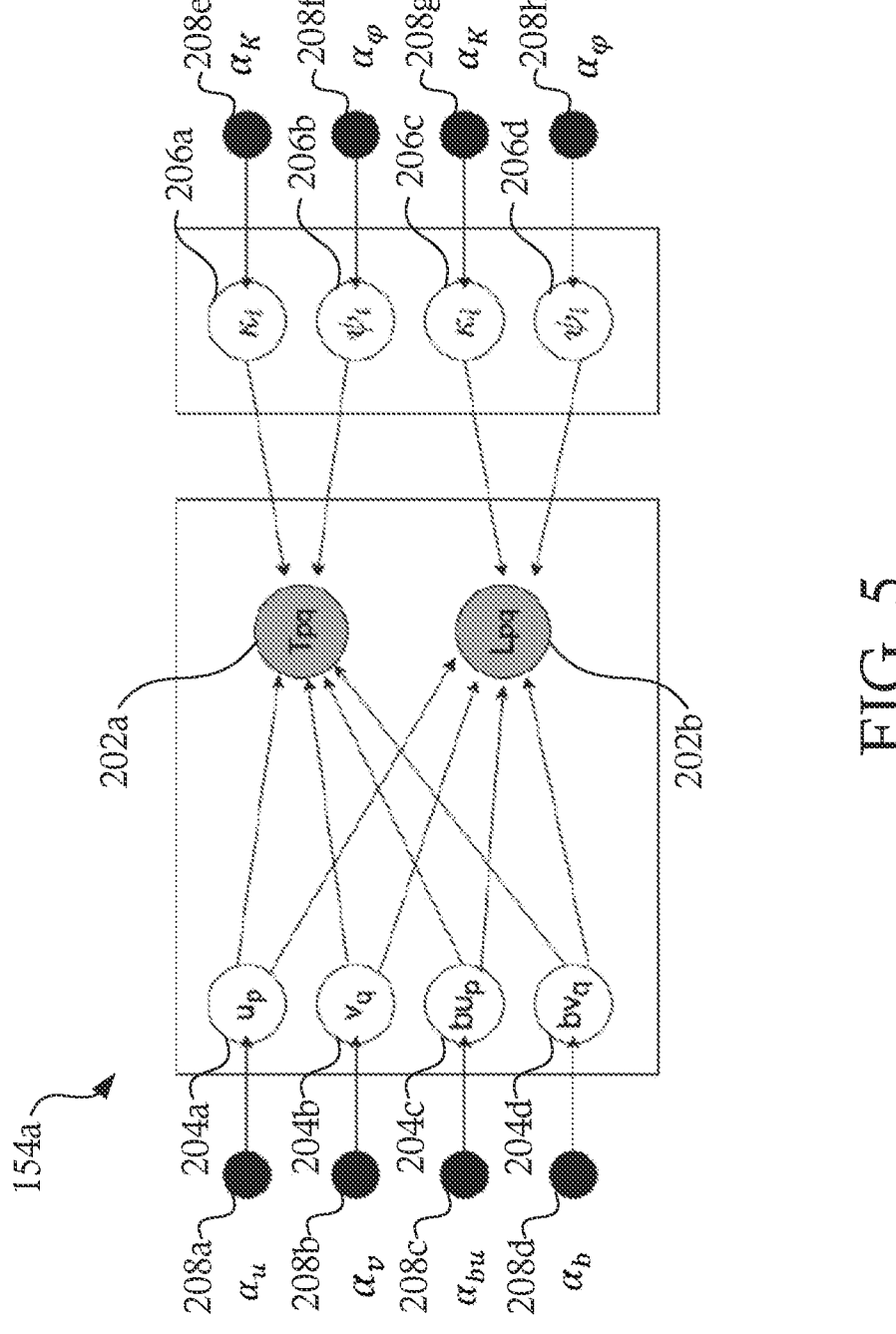
FIG. 5 illustrates a modified collaborative filtering model, in accordance with some embodiments.

FIG. 5 illustrates a modified collaborative filtering model 154a, in accordance with some embodiments. The modified collaborative filtering model 154a includes a set of local variables 204a-204d that are common to each of the transaction distribution calculation 202a and the loyalty distribution calculation 202b (e.g., embeddings of the $p^{th}$ user and the $q^{th}$ attribute). In addition, the modified collaborative filtering model 154a includes a set of global variables 206a-206d. The modified collaborative filtering model 154a includes hyperparameters 208a-208h that may be applied to each of the inputs 204a-204d, 206a-206d.

In some embodiments, the variables 204a-204d, 206a-206d have normal priors with mean 0 (except the scale parameters, which have a mean of 1) and a variance that depends on a hyperparameter 208a-208h. The posterior equation of the modified collaborative filtering model 154a may be denoted as:

$$P(\theta \,|\, T, L, H) \propto P(T, L \,|\, \theta, H) P(\theta \,|\, H) =$$

$$\prod_{(p,q,T_{pq})\in T} P(T_{pq} \,|\, u_p, v_q, bu_p, bv_q, \kappa_t, \psi_t, H)$$

-continued $$\prod_{(p,q,L_{pq})\in L} P(L_{pq} \,|\, u_p, v_q, bu_p, bv_q, \kappa_l, \psi_l, H)$$

$$\prod_{p=1}^{m} [P(u_p \,|\, \alpha_u) P(bu_p \,|\, \alpha_{bu})] \prod_{q=1}^{n} [P(v_p \,|\, \alpha_v) P(bv_q \,|\, \alpha_{bv})]$$

$$P(\kappa_t \,|\, \alpha_{\kappa_t}) P(\psi_t \,|\, \alpha_{\psi_t}) P(\kappa_l \,|\, \alpha_{\kappa_l}) P(\psi_l \,|\, \alpha_{\psi_l}) =$$

$$\prod_{(p,q,T_{pq})\in T} \mathcal{N}(\kappa_t (u_p^T v_q + bu_p + bv_q) + \psi_t, (\gamma\beta)^{-1})$$

$$\prod_{(p,q,L_{pq})\in L} \mathcal{N}(\kappa_l (u_p^T v_q + bu_p + bv_q) + \psi_l, ((1-\gamma)\beta)^{-1})$$

$$\prod_{p=1}^{m} [\mathcal{N}(0, \alpha_u^{-1} I_d) \mathcal{N}(0, \alpha_{bu}^{-1})]$$

$$\prod_{q=1}^{m} [\mathcal{N}(0, \alpha_v^{-1} I_d) \mathcal{N}(0, \alpha_{bv}^{-1})]$$

$$\mathcal{N}(1, \alpha_{\kappa_t}^{-1}) \mathcal{N}(0, \alpha_{\psi_t}^{-1}) \mathcal{N}(1, \alpha_{\kappa_l}^{-1}) \mathcal{N}(0, \alpha_{\psi_l}^{-1})$$

where $\theta$ represents the latent variables (e.g., user and category embeddings, biases, etc.), H represents the set of all hyperparameters (e.g., hyperparameters 208a-208h in FIG. 5, $\gamma$, and $\beta$), $u_p$ and $v_g$ are the embedding vectors of the $p^{th}$ user and the $q^{th}$ category, $bu_p$ and $bv_q$ are the corresponding bias vectors, $\alpha$ is a hyperparameter that controls the variance of the corresponding distributions, and $\kappa$ and $\psi$ are the scale and location parameters which allow the two distributions, $T_{pq}$ and $L_{pq}$, a degree of freedom despite sharing parameters, T is the transaction matrix and L is the loyalty matrix, each constituting the observed data. The $\gamma$ and $\beta$ hyperparameters allow tuning of the likelihood distributions relative to each other.

The posterior $P(\theta|T,L,H)$ is the family of high dimensional latent variables $\theta$ and can be obtained, with the initial prior distributions over the latent variables and the likelihood function $P(T,L|\theta,H)$, according to Bayes' Rule. In some embodiments, the likelihood and priors are crafted using domain expertise. As will be appreciated, solving the posterior distribution equation for the modified collaborative filtering model 154a would result in an intractably high dimensional integration in the denominator.

In some embodiments, a variational inference, such as a Bayesian variational inference, is applied to reduce calculation times. The posterior approximation is treated as an optimization problem through variational inference. The objective of the variational inference is to find the variational distribution which is a proxy-posterior q parametrized by v such that the variational distribution is least-divergent from the true posterior $p(\theta|T,L,)$. In some embodiments, a Kullback-Leibler divergence (KL divergence) is applied as a divergence metric between the distributions.

In some embodiments, minimization of the KL divergence is performed by applying maximization of an evidence lower bound (ELBO). The ELBO, $\mathcal{L}$ (v), is provided by:

$$\mathcal{L}(v) = \mathbb{E}_q[\log(p(T,L,\theta)) - \log(q(\theta;v))]$$

The provided terms indicate a trade-off between the log likelihood of the data and the prior over the parameters of the model. The first term in the equation maximizes the likelihood of the observed transactions and the temporal loyalty scores, given the embedding vectors. The second term acts as a regularizer that attempts to minimize the divergence from the prior and thus prevents the optimizer from converging to the maximum likelihood estimate.

In some embodiments, stochastic gradient descent, coordinate descent, and/or other variants of gradient descent are applied to compute gradients and update the parameters. The gradients may be obtained by rewriting the ELBO equation in terms of the complete log likelihood and then computing the gradient:

$$\nabla_v \mathcal{L}(v) = \nabla_v \mathbb{E}_q[\log(p(T,L,\theta)) - \log(q(\theta;v))]$$

which may further be re-written as:

$$\nabla_v \mathcal{L}(v) = \mathbb{E}_q[\nabla_v \log(q(\theta;v))\log(p(T,L,\theta)) - \log(q(\theta;v))]$$

A posterior predictive function is generated by the variational inference. In some embodiments, the posterior predictive function uses the likelihood function $P(T,L|\theta,H)$ to generate attribute predictions. After estimation of the latent variables $\theta$, the values of the transaction entry $T_{pq}$ and the temporal loyalty entry $L_{pq}$ for a user p and an attribute q are estimated from the distribution, where:

$$T_{pq} \sim \mathcal{N}\left(\kappa_t\left(u_p^T v_q + bu_p + bv_q\right) + \psi_t, (\gamma B)^{-1}\right)$$

$$L_{pq} \sim \mathcal{N}\left(\kappa_l\left(u_p^T v_q + bu_p + bv_q\right) + \psi_l, ((1-\gamma)B)^{-1}\right)$$

The values for the transaction entry $T_{pq}$ and the temporal loyalty entry $L_{pq}$ are combined (e.g., simple addition) to generate an overall score for the particular user-attribute pair.

Figure 6:
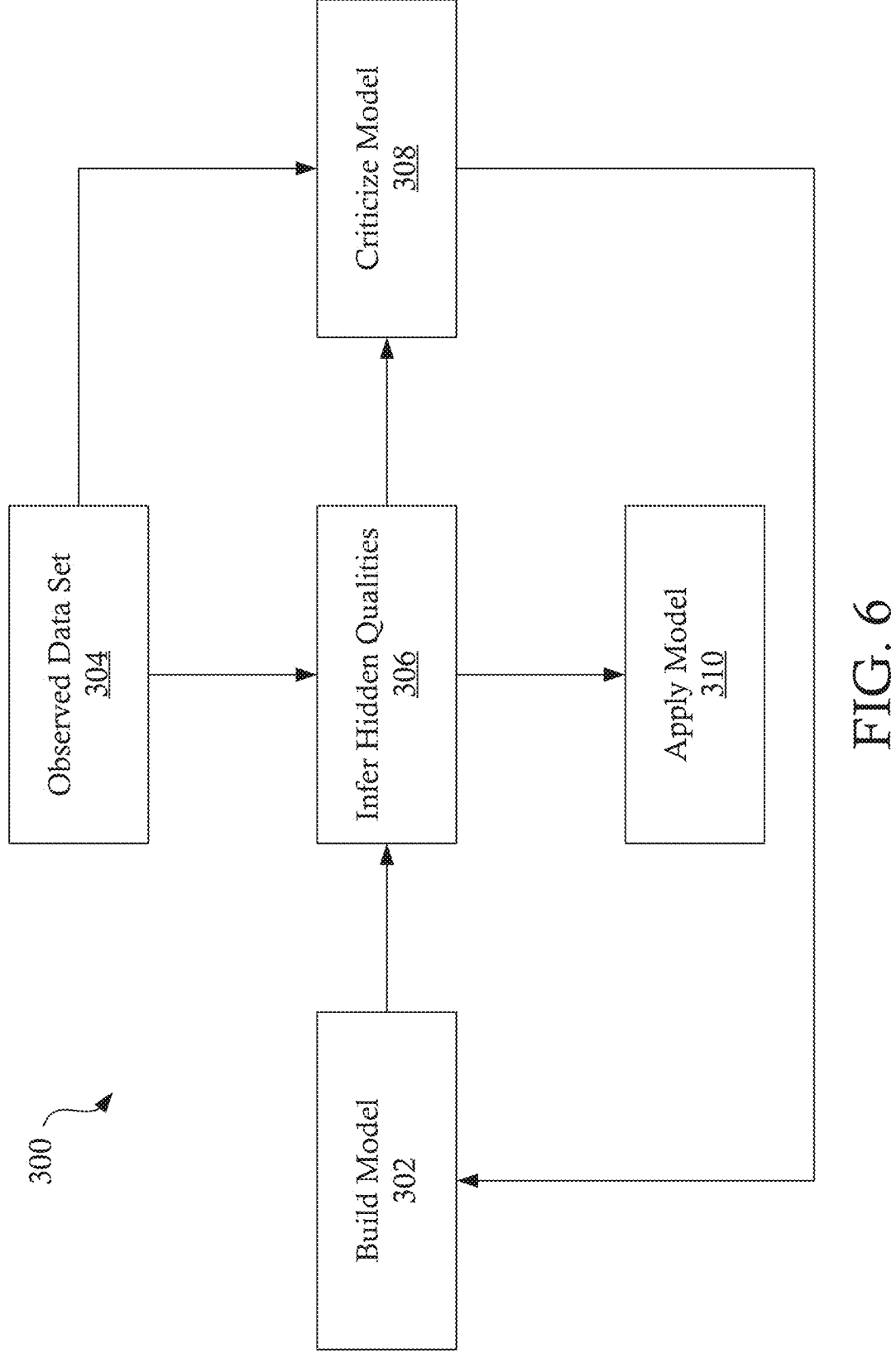
FIG. 6 illustrates an iterative probabilistic pipeline, in accordance with some embodiments.

In some embodiments, an iterative training loop, such as an iterative probabilistic pipeline (e.g., Box's loop) may be applied to generate the variational inference model 158. As illustrated in FIG. 6, an iterative probabilistic pipeline 300 begins by building 302 a model for predicting values, such as for predicting transaction matrix and loyalty matrix values. The generated model is provided to a hidden inference process 306 that attempts to infer hidden values, e.g., hyperparameters, of the model based on an observed data set 304 provided to the hidden inference process 306. In the illustrated embodiments, the observed data set 304 includes the transaction matrix T and the loyalty matrix L previously discussed. The inferred hidden values are applied and the model is criticized 308 to determine the accuracy of the generated hidden values. The error between the inferred hidden values and the observed data set 304 is used to generate a revised model 302. This process continues iteratively for a predetermined number of steps until a model with determined inferred values is output and applied 310.

In some embodiments, as shown in FIG. 4, a graphical data set 170 is used to provide initial embedding values for a heterogeneous user interaction graph configured to represent user interactions with a network interface is generated. In some embodiments a heterogeneous user interaction graph (G) is defined as:

$$G = (V, E, T)$$

where V is the set of vertices (e.g., nodes) within the graph, E is the set of edges, and T is the set of vertex types. The set of vertex types T may include any suitable vertex types. For example, in some embodiments, the set of vertex types T includes Users, Baskets, and Categories, although it will be appreciated that other category types may be used.

In some embodiments, the heterogeneous user interaction graph provides structure information from which semantic representations (e.g., embeddings) are extracted. For example, semantic representations may be extracted from the context of a given node (e.g., category or user) within the heterogeneous user interaction graph. The embeddings may be configured to provide initialization points for matrix factorization over temporal signals, as discussed in greater detail below.

The context of a node may be defined by any suitable process. For example, in some embodiments, one or more random walks are performed to determine the context of a given node. In this context, a random walk includes a stochastic process during which a path from a starting vertex is randomly determined such that the next node in a path is selected uniformly at random from one or more neighboring nodes. In some embodiments, the context of a node is represented by $C_t(v)$, which represents node v's neighborhood with the $t^{th}$ type of node. In some embodiments, a heterogeneous skip-gram model is applied to the interaction graph to maximize a heterogeneous context for all of the nodes in the graph. Maximization of the heterogeneous context may occur according to the equation:

$$\underset{\theta}{\text{argmax}} \sum_{v \in V} \sum_{t \in T} \sum_{c_t \in C_t(v)} \log p(c_t \mid v; \theta)$$

where probability $p(c_t|v;\theta)$, parameterized by the family parameters $\theta$, is a softmax over the nodes from the context. In some embodiments, probability $p(c_t|v;\theta)$ is determined according to:

$$\frac{e^{X_{c_t} \cdot X_v}}{\sum_{u \in V} e^{X_u \cdot X_v}}$$

where any vector $X_i$ represents the embedding vector of a node i belonging to the graph. Thus, for a given node v, the numerator represents an inner product between the context node and a given node and the denominator provided normalization over all nodes in the graph. In some embodiments, negative sampling may be applied to the context determination to increase computational efficiency.

In some embodiments, a random walk method configured to generate node contexts having semantics is implemented. For example, a Metapath2Vec process may be used to traverse the heterogeneous user interaction graph to determine node contexts. The Metapath2Vec process utilizes a predetermined schema to transition over the nodes. The predetermined schema may include any suitable schema. Examples herein include a schema of User-Basket-Category-Basket-User, although it will be appreciated that any suitable schema that incorporates the set of T vertex types may be used. In various embodiments, one or more parameters of the schema, such as length of the random walk, may be varied during training of the category selection model, as discussed in greater detail below. In some embodiments, transition between two nodes may depend on the connectivity of a given node and a decaying probability configured to prevent over-inclusion.

At step 108, the variational inference model 158 is output for use in attribute prediction. For example, in some embodiments, the variational inference model 158 is provided to a recommendation engine 160 configured to generate a user-attribute affinity score, e.g., the combined transaction entry $T_{pq}$ and temporal loyalty entry $L_{pq}$ scores.

In some embodiments, user data, such as a user identifier, prior user transaction data, etc., may be received by the recommendation engine 160. The recommendation engine 160 applies the variational inference model 158 to user data 168 to generate user-attribute affinity scores 162 for each attribute in a set of attributes. For example, for category recommendations, the attribute is the set of categories represented by the items in an item catalog. A user-attribute affinity score 162 may be calculated for each category. User data 168 may include current and/or historical user interaction data, such as, for example, user item interactions such as an item view (e.g., user seeing an item in search results, recommended items, ad, etc.), item click-through (e.g., user clicking on link to go to product-specific information), item add-to-cart (e.g., user adding the product to a virtual cart for future purchase), item purchase (user ordering the item), etc. In some embodiments, a set of N attributes having the highest user-attribute affinity score 162 are selected by a network interface engine 164 for use in generating a network interface for a user.

At step 110, the set of N attributes, selected using the user-attribute affinity scores 162, is used to generate a network interface 166 including personalized recommendations for a user associated with the user system 22a. In some embodiments, the set of N attributes may be combined with base attributes or recommendations 184 that are selected for all users (e.g., non-personalized attributes). The combined attributes may be ranked using any suitable ranking system, such as a P13n re-ranker, and the top set of combined attributes are used to populate a network interface 166 with content. For example, in embodiments in which the attribute is product categories, products from the set of N categories and/or products from "base" categories may be combined by the network interface engine 164 and presented to the user via the network interface 166.

In some embodiments, the set of N recommendations may be provided to additional recommendation systems and/or processes that are configured to generate granular recommendations. The set of N recommendations may be used as an initial step in a hierarchical recommendation process.

The disclosed systems and methods for attribute recommendation provide an improvement over standard collaborative filtering-based recommendation processes. For example, the disclosed systems and methods were applied to data sets including user grocery data and data sets including book purchases. The data sets were split into training and testing data sets, with a set of data representing the first (n–1) months of data as the training set and the last month of data as the testing set. The modified collaborative recommendation process disclosed herein was compared to certain prior art recommendation processes, such as an item popularity process (Pop) and a classic matrix factorization (MF) process, a Bayesian Personalized Ranking (BPR) process, and/or a Metapath2Vec (M2V) embeddings process. The popularity process captures the popularity of attributes across each user and recommends the most popular attributes for the user. The classic matrix factorization process included an implicit OCCF Matrix Factorization in which observed transaction data is used to learn latent factors for the users and the attributes using a standard alternating least square (ALS) optimization. The implicit OCCF Matrix Factorization does not consider any temporal elements. BPR and M2V are similarly known in the art. In some embodiments, the comparison was performed both with and without explore-exploit layers included.

For the sets of grocery purchases, the ground truth dataset was set as the list of brands that were actually purchased by the user. For the sets of book purchases, the ground truth dataset was set as a list of authors of books read by the user. The predictions for each test were grocery brands or authors, respectively, ordered by probability that a given user would buy a given brand or read a given author in the test window.

The models were compared using a set of evaluation metrics NDCG@k, which is a normalized cumulative gain for k shown recommendations, MAP@k, which is the mean of the average precision scores over a set of queries, Hit Rate@k, which provides the true positive rate of a prediction, MRR@k, which is the average reciprocal rank of a query response, Limited AUC@k, which is the area-under-the-curve (AUC) of a portion of a receiver operating characteristic (ROC) curve corresponding to the top k recommendations. Additional details regarding the implementation of the testing data set may be found in *On Variational Inference for User Modeling in Attribute-Driven Collaborative Filtering*, Venugopal Mani, Ramasubramanian Balasubramanian, Sushant Kumar, Abhinav Mathur, and Kannan Achan, arXiv:2021.10577 and *Variational Inference for Category Recommendation in E-Commerce platforms*, Ramasubramanian Balasubramanian, Venugopal Mani, Sushant Kumar, Abhinav Mathur, and Kannan Achan, arXiv:2104.07748, each of which is incorporated herein by reference in their entireties.

The below charts show the results of the comparisons of the disclosed systems and methods to various prior-art processes. As shown in the first two charts, the prior art Pop and MF methods with the explore-exploit strategy suffer from trading off accuracy for diversity and therefore do not perform as well as other models or processes. The disclosed systems and methods using a modified collaborative filtering model outperforms both the Pop and MF methods, with or without explore-exploit mechanism, in all metrics. For example, as shown in the first two charts below, the disclosed systems and methods provide an improvement over the best prior art method (e.g., MF) in both data sets of at least 1 to 3 percent, which is a significant improvement given the size and scale of the datasets.

| | | Author-Recommendation Test Set | | | | |
| --- | --- | --- | --- | --- | --- | --- |
| | | Method | | | | |
| Metric | | Pop + EE | MF + EE | Pop | MF | VI – MF |
| NDCG | @5 | 0.020 | 0.027 | 0.047 | 0.068 | 0.069 |
| | @10 | 0.014 | 0.019 | 0.034 | 0.049 | 0.051 |
| | @15 | 0.012 | 0.016 | 0.030 | 0.043 | 0.044 |
| | @20 | 0.010 | 0.015 | 0.028 | 0.040 | 0.041 |
| MAP | @5 | 0.007 | 0.013 | 0.017 | 0.033 | 0.034 |
| | @10 | 0.004 | 0.008 | 0.011 | 0.021 | 0.022 |
| | @15 | 0.003 | 0.006 | 0.009 | 0.018 | 0.018 |
| | @20 | 0.002 | 0.005 | 0.008 | 0.016 | 0.017 |
| HR | @5 | 0.031 | 0.028 | 0.070 | 0.069 | 0.071 |
| | @10 | 0.018 | 0.017 | 0.041 | 0.041 | 0.042 |
| | @15 | 0.013 | 0.014 | 0.031 | 0.031 | 0.033 |
| | @20 | 0.011 | 0.012 | 0.026 | 0.027 | 0.028 |
| MRR | @5 | 0.033 | 0.061 | 0.075 | 0.148 | 0.150 |
| | @10 | 0.034 | 0.061 | 0.075 | 0.148 | 0.151 |
| | @15 | 0.034 | 0.061 | 0.075 | 0.149 | 0.151 |
| | @20 | 0.034 | 0.061 | 0.076 | 0.149 | 0.152 |

-continued

Author-Recommendation Test Set

| Metric | | Method | | | | |
| --- | --- | --- | --- | --- | --- | --- |
| | | Pop + EE | MF + EE | Pop | MF | VI – MF |
| LAUC | @5 | 0.514 | 0.512 | 0.533 | 0.533 | 0.534 |
| | @10 | 0.508 | 0.507 | 0.521 | 0.521 | 0.522 |
| | @15 | 0.506 | 0.505 | 0.517 | 0.517 | 0.518 |
| | @20 | 0.505 | 0.505 | 0.516 | 0.516 | 0.516 |

First Grocery Recommendation Test Set

| Metric | | Method | | | | |
| --- | --- | --- | --- | --- | --- | --- |
| | | Pop + EE | MF + EE | Pop | MF | VI – MF |
| NDCG | @5 | 0.020 | 0.027 | 0.047 | 0.068 | 0.069 |
| | @10 | 0.014 | 0.019 | 0.034 | 0.049 | 0.051 |
| | @15 | 0.012 | 0.016 | 0.030 | 0.043 | 0.044 |
| | @20 | 0.010 | 0.015 | 0.028 | 0.040 | 0.041 |
| MAP | @5 | 0.007 | 0.013 | 0.017 | 0.033 | 0.034 |
| | @10 | 0.004 | 0.008 | 0.011 | 0.021 | 0.022 |
| | @15 | 0.003 | 0.006 | 0.009 | 0.018 | 0.018 |
| | @20 | 0.002 | 0.005 | 0.008 | 0.016 | 0.017 |
| HR | @5 | 0.031 | 0.028 | 0.070 | 0.069 | 0.071 |
| | @10 | 0.018 | 0.017 | 0.041 | 0.041 | 0.042 |
| | @15 | 0.013 | 0.014 | 0.031 | 0.031 | 0.033 |
| | @20 | 0.011 | 0.012 | 0.026 | 0.027 | 0.028 |
| MRR | @5 | 0.033 | 0.061 | 0.075 | 0.148 | 0.150 |
| | @10 | 0.034 | 0.061 | 0.075 | 0.148 | 0.151 |
| | @15 | 0.034 | 0.061 | 0.075 | 0.149 | 0.151 |
| | @20 | 0.034 | 0.061 | 0.076 | 0.149 | 0.152 |
| LAUC | @5 | 0.514 | 0.512 | 0.533 | 0.533 | 0.534 |
| | @10 | 0.508 | 0.507 | 0.521 | 0.521 | 0.522 |
| | @15 | 0.506 | 0.505 | 0.517 | 0.517 | 0.518 |
| | @20 | 0.505 | 0.505 | 0.516 | 0.516 | 0.516 |

The below two charts show a comparison of the disclosed systems and methods to a Pop, MF, BPR, and M2V process. For the below comparisons, there is approximately a 40% lift in NDCG with respect to the next closest baseline. In all instances, the disclosed systems and methods outperform the prior art methods.

Second Grocery Recommendation Test Set

| Metric | | Method | | | | |
| --- | --- | --- | --- | --- | --- | --- |
| | | Pop | MF | BPR | M2V | M2V + VI |
| NDCG | @5 | 0.025 | 0.040 | 0.053 | 0.050 | 0.061 |
| | @10 | 0.020 | 0.033 | 0.039 | 0.039 | 0.052 |
| | @15 | 0.018 | 0.032 | 0.037 | 0.036 | 0.047 |
| | @20 | 0.018 | 0.032 | 0.036 | 0.035 | 0.046 |
| HR | @5 | 0.023 | 0.042 | 0.057 | 0.057 | 0.073 |
| | @10 | 0.014 | 0.028 | 0.035 | 0.035 | 0.054 |
| | @15 | 0.012 | 0.026 | 0.029 | 0.028 | 0.043 |
| | @20 | 0.011 | 0.027 | 0.027 | 0.026 | 0.040 |
| MRR | @5 | 0.051 | 0.076 | 0.089 | 0.088 | 0.102 |
| | @10 | 0.051 | 0.077 | 0.089 | 0.088 | 0.107 |
| | @15 | 0.052 | 0.079 | 0.089 | 0.088 | 0.105 |
| | @20 | 0.052 | 0.080 | 0.089 | 0.088 | 0.105 |
| MAP | @5 | 0.012 | 0.020 | 0.024 | 0.024 | 0.030 |
| | @10 | 0.009 | 0.014 | 0.017 | 0.017 | 0.022 |
| | @15 | 0.008 | 0.013 | 0.016 | 0.015 | 0.020 |
| | @20 | 0.008 | 0.013 | 0.015 | 0.015 | 0.019 |
| LAUC | @5 | 0.512 | 0.522 | 0.529 | 0.529 | 0.542 |
| | @10 | 0.509 | 0.516 | 0.520 | 0.520 | 0.529 |
| | @15 | 0.508 | 0.516 | 0.518 | 0.518 | 0.526 |
| | @20 | 0.508 | 0.516 | 0.518 | 0.517 | 0.525 |

Third Grocery Recommendation Test

| Metric | | Method | | | | |
| --- | --- | --- | --- | --- | --- | --- |
| | | Pop | MF | BPR | M2V | M2V + VI |
| NDCG | @5 | 0.191 | 0.256 | 0.271 | 0.336 | 0.462 |
| | @10 | 0.124 | 0.186 | 0.206 | 0.219 | 0.305 |
| | @15 | 0.097 | 0.157 | 0.178 | 0.171 | 0.241 |
| | @20 | 0.082 | 0.140 | 0.161 | 0.145 | 0.207 |
| HR | @5 | 0.179 | 0.240 | 0.259 | 0.350 | 0.519 |
| | @10 | 0.090 | 0.149 | 0.173 | 0.176 | 0.267 |
| | @15 | 0.061 | 0.117 | 0.142 | 0.119 | 0.185 |
| | @20 | 0.046 | 0.102 | 0.126 | 0.091 | 0.146 |
| MRR | @5 | 0.348 | 0.404 | 0.408 | 0.480 | 0.482 |
| | @10 | 0.348 | 0.406 | 0.411 | 0.480 | 0.482 |
| | @15 | 0.348 | 0.407 | 0.412 | 0.480 | 0.482 |
| | @20 | 0.348 | 0.407 | 0.412 | 0.480 | 0.482 |
| MAP | @5 | 0.089 | 0.142 | 0.154 | 0.198 | 0.321 |
| | @10 | 0.045 | 0.080 | 0.092 | 0.099 | 0.164 |
| | @15 | 0.030 | 0.050 | 0.068 | 0.067 | 0.112 |
| | @20 | 0.023 | 0.046 | 0.056 | 0.052 | 0.087 |
| LAUC | @5 | 0.589 | 0.619 | 0.629 | 0.641 | 0.751 |
| | @10 | 0.543 | 0.574 | 0.585 | 0.586 | 0.632 |
| | @15 | 0.528 | 0.556 | 0.568 | 0.557 | 0.591 |
| | @20 | 0.520 | 0.548 | 0.559 | 0.543 | 0.570 |

Figure 7A:
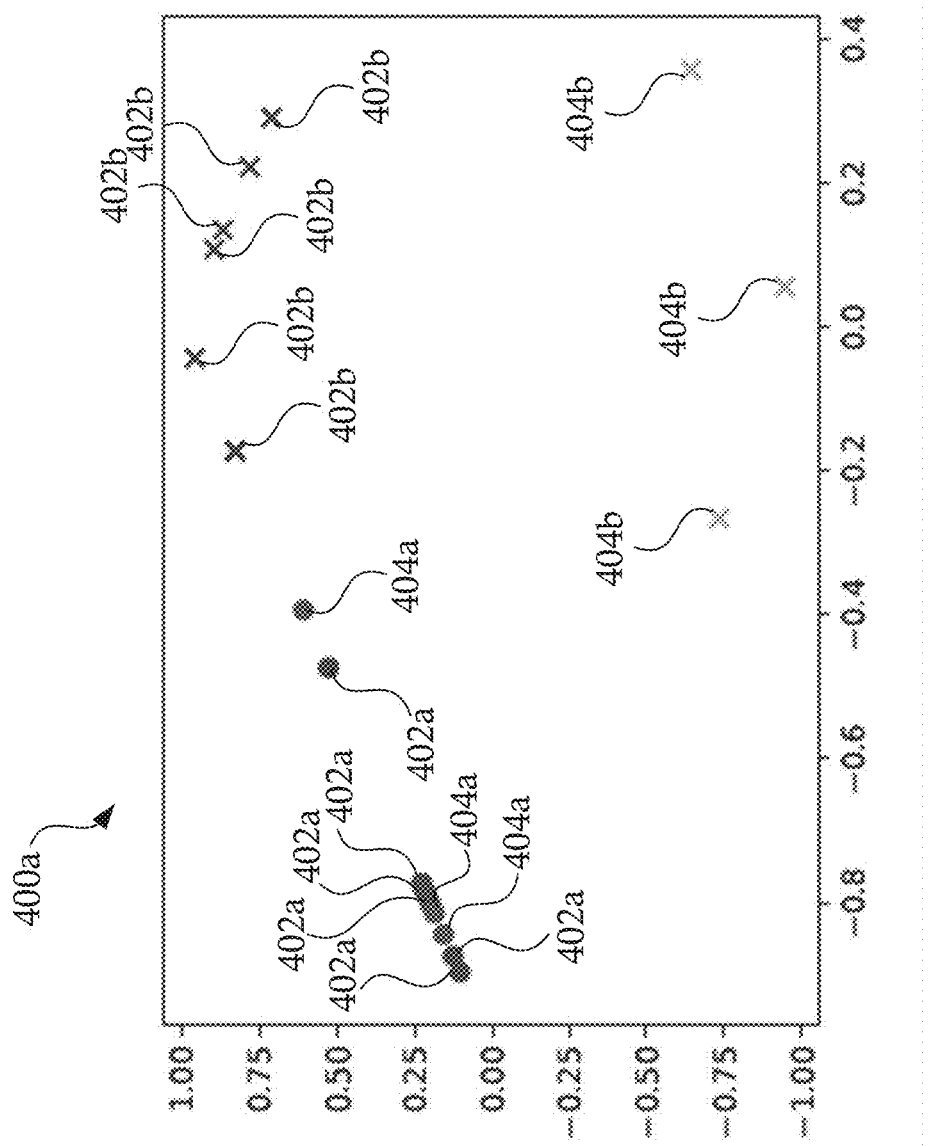
FIGS. 7A-7C illustrate embeddings corresponding to product families generated by a Metapath2Vec algorithm and a modified collaborative filtering model, in accordance with some embodiments.
Figure 7B:
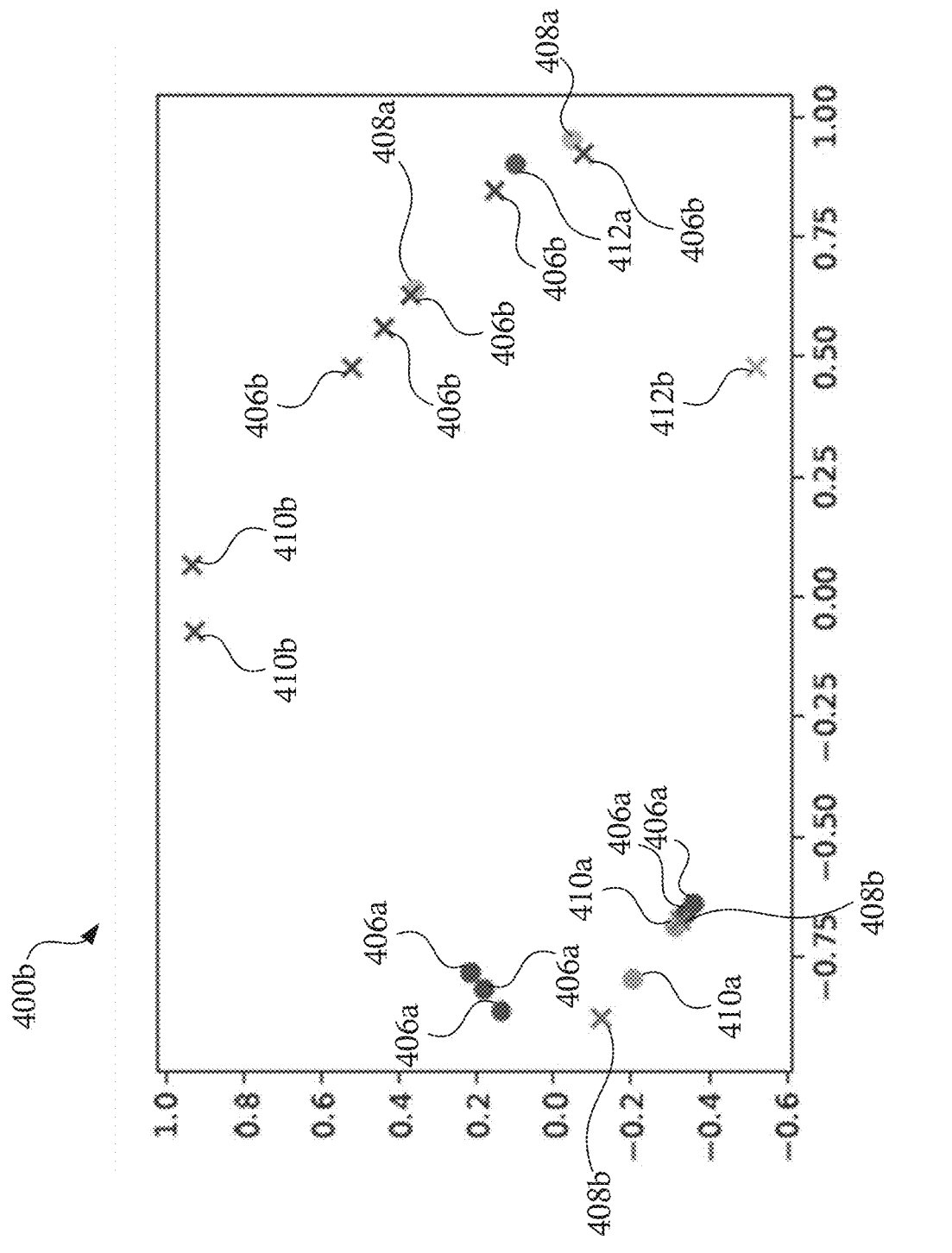
Figure 7C:
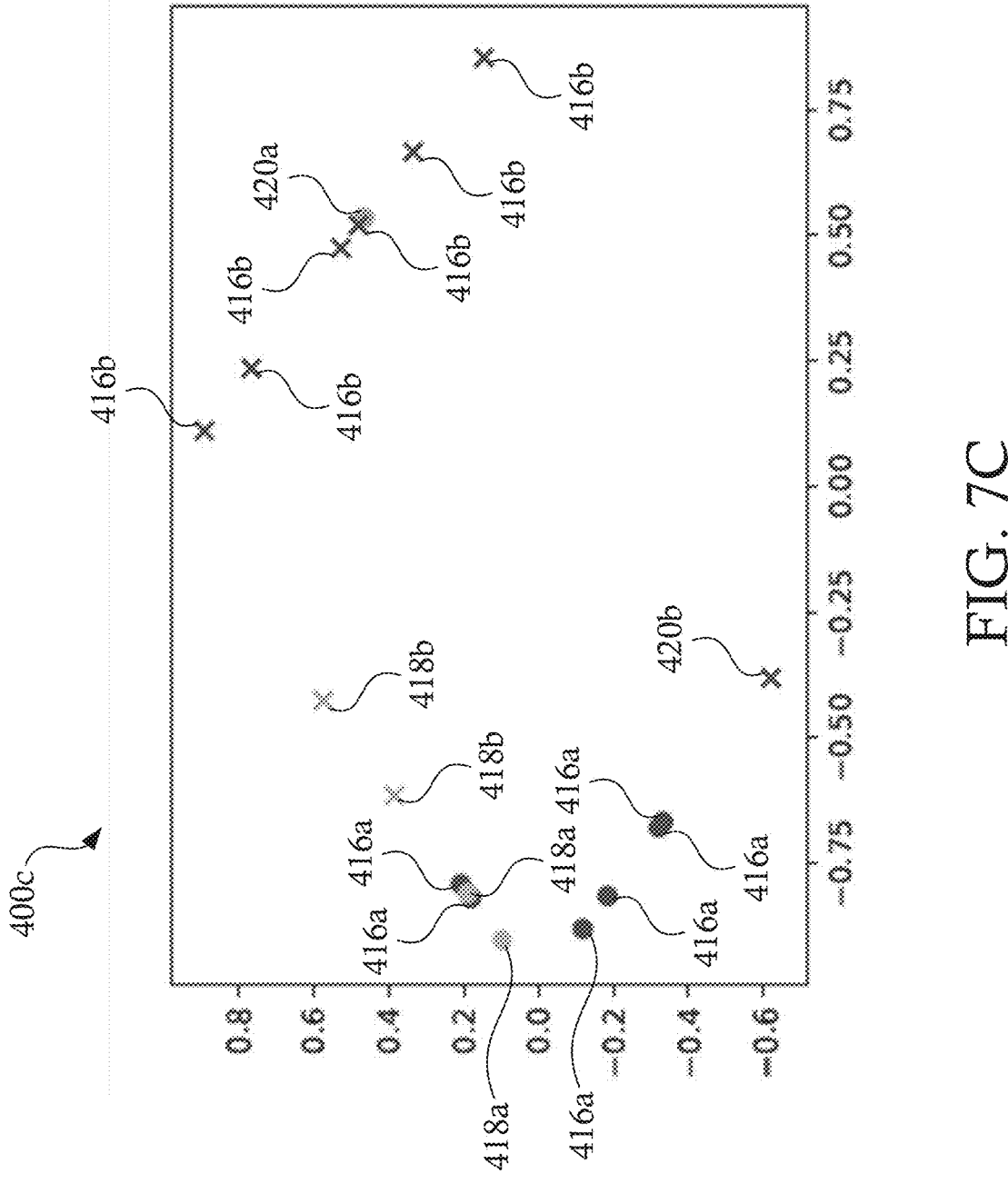

FIGS. 7A-7C illustrate plots 400a-400c of three different subspaces in an embedding space with the disclosed variational inference-based systems and methods compared to the M2V algorithm with respect to semantics of the product clusters. The plots are projected into two-dimensions and normalized by rows to get the two embeddings on the same scale. FIG. 7A illustrates a case study with respect to categories related to coffee, e.g., coffee accessories 402a, 402b (decanters, filters, grinders, percolators, drippers, pods, etc.) and coffee powders 404a, 404b (whole bean, instant coffee, ground coffee, etc.). Although the M2V algorithm successfully clusters relevant categories 402a, 404a, there is no distinction between the coffee accessory category 402a and the coffee powder category 404a. In contrast, the disclosed variational inference-based method successfully clusters the relevant categories 402b, 404b and includes a clear separation between the coffee accessory category 402b and the coffee powder category 404b.

FIG. 7B illustrates a similar comparison with respect to categories related to showers, e.g., accessories 406a, 406b (organizers, stalls and bases, curtains and liners, curtain rods, curtain rings, bath stools, benches, etc.), body washes 408a, 408b (shower gels, in-shower lotions, etc.), shower gear 410a, 410b (portable shower gear, shower caps, etc.), and pet-based shower products 412a, 412b (pet shower and bath accessories, etc.). As in FIG. 7A, the M2V algorithm fails to provide adequate separation of the various categories 410a-410d, while the disclosed variational inference-based method includes distinct clustering of the various categories 410b-414b and clear distinction between the various categories 410b-414b.

FIG. 7C illustrates a similar comparison with respect to categories related to cakes, e.g., cake accessories 416a, 416b (boards and circles, servers, turntables, boxes, pan, stands), cakes and icing 418a, 418b (cakes, cake toppers), and rice cakes 420a, 420b (rice cakes). While both the prior art M2V algorithm and the disclosed variational inference-based methods are capable of separating out rice cakes 420a, 420b, the variational inference-based method performs better in separating cake accessories 416b from cakes and icings 418b.

Although the subject matter has been described in terms of exemplary embodiments, the claims should be construed broadly, to include other variants and embodiments, which may be made by those skilled in the art.

What is claimed is:

1. A system, comprising:

a processor; and a non-transitory memory storing instructions that, when executed, cause the processor to:

receive, via a network interface, transaction data related a user;

generate, based on the transaction data, a transaction matrix characterizing user interactions with each of a plurality of attributes and a loyalty matrix characterizing a number of the user interactions associated with each attribute of the plurality of attributes, wherein each number of the user interactions is weighted based on an elapsed time since each corresponding user interaction;

generate, by a modified collaborative filtering model, a distribution of the transaction matrix and a distribution of the loyalty matrix, wherein the modified collaborative filtering model comprises a set of parameters that are used for the generation of each of the distribution of the transaction matrix and the distribution of the loyalty matrix, wherein the modified collaborative filtering mode is trained based on a set of training data comprising transaction matrices and loyalty matrices, and wherein at least a portion of the set of parameters are determined based on applying a variational inference to a generated distribution of the transaction matrices and a generated distribution of the loyalty matrices to determine a least divergence from a true distribution of each of the transaction matrices and the loyalty matrices;

generate a transaction entry for each of one or more user-attribute pairs based on the distribution of the transaction matrix;

generate a temporal entry for each of the one or more user-attribute pairs based on the distribution of the loyalty matrix;

determine an overall score for the one or more user-attribute pairs by combining the transaction entry and the temporal entry for each of the one or more user-attribute pairs;

generate attribute recommendations for the user based on the transaction data, wherein the attribute recommendations are generated by a variational inference model that receives the transaction matrix and the loyalty matrix;

generate a set of N recommendations by ranking the generated attribute recommendations based on the overall score of each user-attribute pair;

generate a user interface including the set of N recommendations; and transmit, via the network interface, the user interface for display to the user.

2. The system of claim 1, wherein the variational inference model includes a variational distribution which is a proxy-posterior that is least-divergent from a true posterior $p(\theta|T,L,)$, where $\theta$ represents latent variables T is the transaction matrix, and L is the loyalty matrix.

3. The system of claim 1, wherein the attribute recommendations are generated by a posterior predictive function generated by the variational inference model.

4. The system of claim 3, wherein the posterior predictive function uses a likelihood function $P(T,L|\theta,H)$, where $\theta$ represents latent variables, T is the transaction matrix, L is the loyalty matrix, and H represents a set of hyperparameters.

5. The system of claim 1, wherein the combined transaction score and loyalty score are generated by combining transaction and loyalty distributions.

6. The system of claim 5, wherein the transaction and loyalty distributions are calculated as:

$$T_{pq} \sim N\left(K_t\left(U_P^T V_q + bu_p\right) + \varphi_T, (\gamma B)^{-1}\right)$$

$$L_{pq} \sim N\left(K_l\left(U_P^T V_q + bu_p\right) + \varphi_l, ((1-\gamma)B)^{-1}\right)$$

where Tpq is a transaction entry for a user p and an attribute q, Lpq is a temporal loyalty entry for the user p and the attribute q, $$U_P^T$$

and $V_q$ are embedding vectors, $bu_p$ is a bias vector, and $\varphi_l$ and $\gamma$ are hyperparameters.

7. The system of claim 1, wherein initial embedding values implemented by the variational inference model are provided by a graphical data set.

8. The system of claim 7, wherein the graphical data set includes a heterogeneous user interaction graph (G) defined as:

$$G=(V,E,T)$$

where V is a set of vertices, E is a set of edges, and Tis a set of vertex types.

9. A non-transitory computer readable medium having instructions stored thereon, wherein the instructions, when executed by a processor cause a device to perform operations comprising:

receiving, via a network interface, transaction data related a user;

generating, based on the transaction data, a transaction matrix characterizing user interactions with each of a plurality of attributes and a loyalty matrix characterizing a number of the user interactions associated with each attribute of the plurality of attributes, wherein each number of the user interactions is weighted based on an elapsed time since each corresponding user interaction;

generating, by a modified collaborative filtering model, a distribution of the transaction matrix and a distribution of the loyalty matrix, wherein the modified collaborative filtering model comprises a set of parameters that are used for the generation of each of the distribution of the transaction matrix and the distribution of the loyalty matrix, wherein the modified collaborative filtering mode is trained based on a set of training data comprising transaction matrices and loyalty matrices, and wherein at least a portion of the set of parameters are determined based on applying a variational inference to a generated distribution of the transaction matrices and a generated distribution of the loyalty matrices to determine a least divergence from a true distribution of each of the transaction matrices and the loyalty matrices;

generating a transaction entry for each of one or more user-attribute pairs based on the distribution of the transaction matrix;

generating a temporal entry for each of the one or more user-attribute pairs based on the distribution of the loyalty matrix;

determining an overall score for the one or more user-attribute pairs by combining the transaction entry and the temporal entry for each of the one or more user-attribute pairs;

generating attribute recommendations for the user based on the transaction data, wherein the attribute recommendations are generated by a variational inference model that receives the transaction matrix and the loyalty matrix;

generating a set of N recommendations by ranking the generated attribute recommendations based on the overall score of each user-attribute pair;

generating a user interface including the set of N recommendations; and transmitting, via the network interface, the user interface for display to the user.

10. The non-transitory computer readable medium of claim 9, wherein the variational inference model includes a variational distribution which is a proxy-posterior that is least-divergent from a true posterior $p(\theta|T,L,)$, where $\theta$ represents latent variables, T is the transaction matrix, and L is the loyalty matrix.

11. The non-transitory computer readable medium memory of claim 9, wherein the attribute recommendations are generated by a posterior predictive function generated by the variational inference model.

12. The non-transitory computer readable medium of claim 11, wherein the posterior predictive function uses a likelihood function $P(T,L|\theta,H)$, where $\theta$ represents latent variables, T is the transaction matrix, L is the loyalty matrix, and H represents a set of hyperparameters.

13. The non-transitory computer readable medium of claim 9, wherein the combined transaction score and loyalty score are generated by combining transaction and loyalty distributions.

14. The non-transitory computer readable medium of claim 13, wherein the transaction and loyalty distributions are calculated as:

$$T_{pq} \sim N\left(K_t\left(U_P^T V_q + bu_p\right) + \varphi_T, (\gamma B)^{-1}\right)$$

$$L_{pq} \sim N\left(K_l\left(U_P^T V_q + bu_p\right) + \varphi_l, ((1 - \gamma)B)^{-1}\right)$$

where Tpq is a transaction entry for a user p and an attribute q, Lpq is a temporal loyalty entry for the user p and the attribute q, $$U_P^T$$

and $V_q$ are embedding vectors, bu$_p$ is a bias vector, and $\varphi_l$ and $\gamma$ are hyperparameters.

15. The non-transitory computer readable medium of claim 9, wherein initial embedding values implemented by the variational inference model are provided by a graphical data set.

16. The non-transitory computer readable medium of claim 15, wherein the graphical data set includes a heterogeneous user interaction graph (G) defined as:

$$G=(V,E,T)$$

where V is a set of vertices, E is a set of edges, and T is a set of vertex types.

17. A method by at least one processor, the method comprising:

receiving, via a network interface, transaction data related a user;

generating, based on the transaction data, a transaction matrix characterizing user interactions with each of a plurality of attributes and a loyalty matrix characterizing a number of the user interactions associated with each attribute of the plurality of attributes, wherein each number of the user interactions is weighted based on an elapsed time since each corresponding user interaction;

generating, by a modified collaborative filtering model, a distribution of the transaction matrix and a distribution of the loyalty matrix, wherein the modified collaborative filtering model comprises a set of parameters that are used for the generation of each of the distribution of the transaction matrix and the distribution of the loyalty matrix, wherein the modified collaborative filtering mode is trained based on a set of training data comprising transaction matrices and loyalty matrices, and wherein at least a portion of the set of parameters are determined based on applying a variational inference to a generated distribution of the transaction matrices and a generated distribution of the loyalty matrices to determine a least divergence from a true distribution of each of the transaction matrices and the loyalty matrices;

generating a transaction entry for each of one or more user-attribute pairs based on the distribution of the transaction matrix;

generating a temporal entry for each of the one or more user-attribute pairs based on the distribution of the loyalty matrix;

determining an overall score for the one or more user-attribute pairs by combining the transaction entry and the temporal entry for each of the one or more user-attribute pairs;

generating attribute recommendations for the user based on the transaction data, wherein the attribute recommendations are generated by a variational inference model that receives the transaction matrix and the loyalty matrix;

generating a set of N recommendations by ranking the generated attribute recommendations based on the overall score of each user-attribute pair;

generating a user interface including the set of N recommendations; and transmitting, via the network interface, the user interface for display to the user.

18. The method of claim 17, wherein the variational inference model includes a variational distribution which is a proxy-posterior that is least-divergent from a true posterior $p(\theta|T,L)$, where $\theta$ represents latent variables, T is the transaction matrix, and L is the loyalty matrix.

19. The method of claim 17, wherein the attribute recommendations are generated by a posterior predictive function generated by the variational inference model, and wherein the posterior predictive function uses a likelihood function $P(T,L|\theta,H)$, where $\theta$ represents latent variables, T is the transaction matrix, L is the loyalty matrix, and H represents a set of hyperparameters.

20. The method of claim 17, wherein initial embedding values implemented by the variational inference model are provided by a graphical data set.

\* \* \* \* \*